US008416529B2

(12) United States Patent
Marshall (10) Patent No.: US 8,416,529 B2
(45) Date of Patent: Apr. 9, 2013

(54) MAGNETICALLY DAMPED RETURN POLE IN A MAGNETIC HEAD

(75) Inventor: Steven Bruce Marshall, Newark, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 257 days.

(21) Appl. No.: 12/870,490

(22) Filed: Aug. 27, 2010

(65) Prior Publication Data

US 2012/0050921 A1 Mar. 1, 2012

(51) Int. Cl.
*G11B 5/17* (2006.01)
*G11B 5/127* (2006.01)

(52) U.S. Cl. .......... 360/125.3; 360/123.04; 360/125.71
(58) Field of Classification Search ........... 360/118–128
See application file for complete search history.

(56) References Cited

U.S. PATENT DOCUMENTS

| 4,517,505 | A | 5/1985 | Cunningham |
| 4,677,512 | A * | 6/1987 | Akiyama et al. ........... 360/110 |
| 5,384,676 | A | 1/1995 | Yokoyama et al. |
| 5,736,798 | A | 4/1998 | O'Brien et al. |
| 5,995,342 | A | 11/1999 | Cohen et al. |
| 6,665,136 | B2 * | 12/2003 | Clinton et al. ................. 360/55 |
| 6,721,129 | B2 | 4/2004 | Lam |
| 6,791,793 | B1 | 9/2004 | Chen et al. |
| 6,906,894 | B2 | 6/2005 | Chen et al. |
| 6,965,494 | B2 * | 11/2005 | Campbell et al. ........ 360/125.04 |
| 7,035,829 | B2 | 4/2006 | Morimoto |
| 7,075,756 | B1 | 7/2006 | Mallary et al. |
| 7,102,854 | B2 | 9/2006 | Wang et al. |
| 7,149,045 | B1 | 12/2006 | Mallary et al. |
| 7,294,947 | B2 | 11/2007 | Corbin, III et al. |
| 7,372,664 | B1 | 5/2008 | Mallary et al. |
| 7,791,838 | B2 * | 9/2010 | Sato et al. ................. 360/125.02 |
| 8,228,627 | B2 * | 7/2012 | Koizumi et al. ................. 360/26 |
| 2004/0252415 | A1 | 12/2004 | Shukh et al. |
| 2006/0002020 | A1 | 1/2006 | Pokhil et al. |
| 2007/0003792 | A1 | 1/2007 | Covington et al. |
| 2008/0273268 | A1 * | 11/2008 | Hsiao et al. ................. 360/234.6 |

* cited by examiner

*Primary Examiner* — Allen Heinz
(74) *Attorney, Agent, or Firm* — Hall Estill Attorneys at Law (57) ABSTRACT

A magnetic head comprises a main pole, a return pole and a magnetic damper. The main pole is configured to emit flux and the return pole is configured to return the flux to the main pole. The magnetic damper is inductively coupled to the return pole and comprises a first conductor spaced from a first side of the return pole, a second conductor spaced from a second side of the return pole and a third conductor connecting the first conductor to the second conductor.

25 Claims, 6 Drawing Sheets

MAGNETICALLY DAMPED RETURN POLE IN A MAGNETIC HEAD

SUMMARY

This disclosure is directed to a read/write head for a data storage system. The head comprises a main pole configured to emit flux, and a return pole configured to return flux to the main pole.

A magnetic damper is configured to dampen response of the return pole to the transitions in the flux positioned. The magnetic damper comprises a first conductor spaced from a first side of the return pole, a second conductor spaced from a second side of the return pole, and a third conductor connecting the first and second conductors. The magnetic damper is inductively coupled to the return pole.

DETAILED DESCRIPTION

Figure 1:
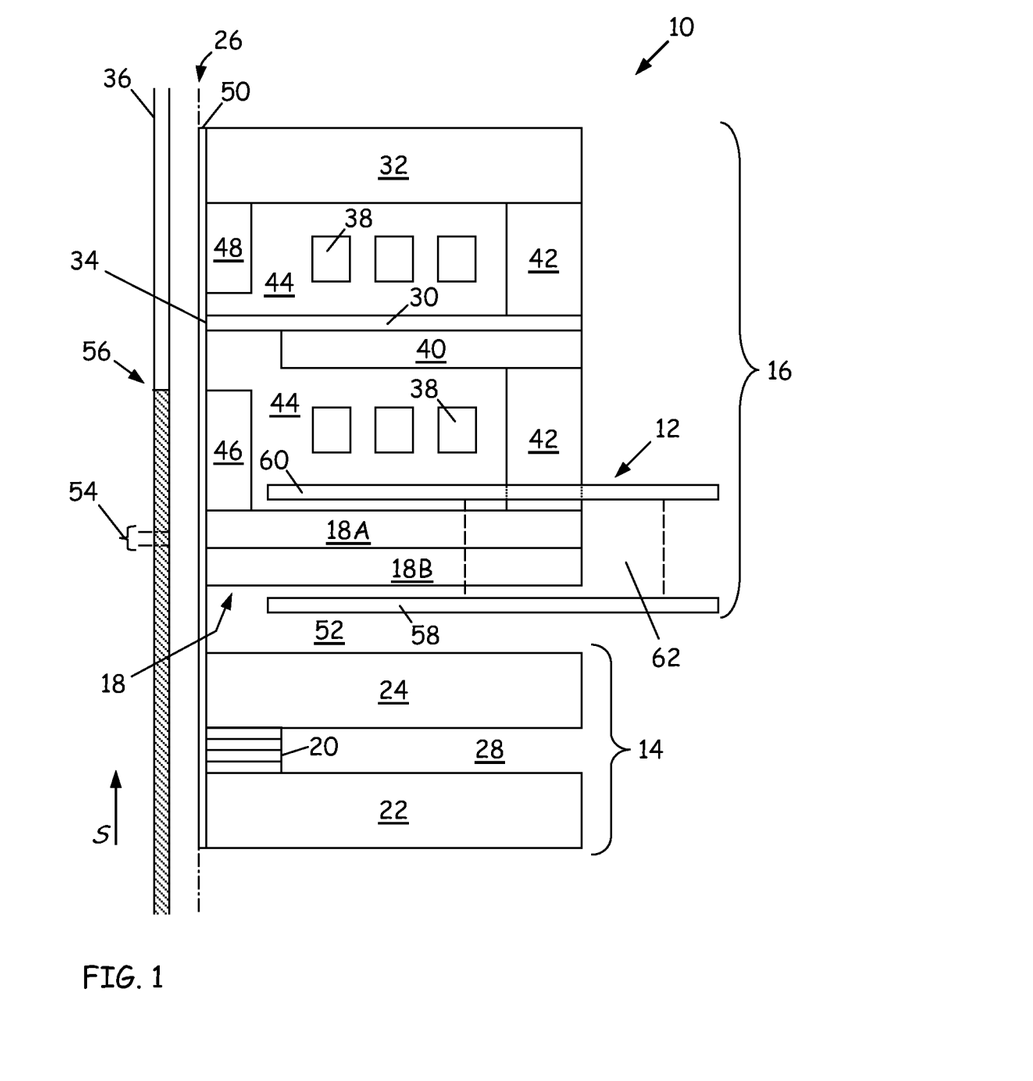
FIG. 1 is a cross-sectional view of a read/write head according to an embodiment having a magnetic damper for reducing side track erasure.

FIG. 1 is a cross-sectional view of an example read/write head 10 according to an embodiment with magnetic damper 12 for reducing side-track erasure. In this particular embodiment, read/write head (or magnetic head) 10 comprises reader portion (reader) 14 and writer portion (writer) 16. Magnetic damper 12 is positioned, for example, about first (bottom) return pole 18 of writer 16, as shown in FIG. 1. Depending on embodiment, magnetic damper 12 may reduce flux spiking and side track erasure, as described below.

Reader 14 comprises read sensor 20 with first (bottom) read shield 22 and second (top) read shield 24. Read sensor 20 comprises an MR element such as a spin valve or MR stack, located between read shields 22 and 24.

Read shields 22 and 24 may be formed of a soft magnetic material such as a nickel-iron (NiFe), cobalt-iron (CoFe) or nickel-cobalt-iron (NiCoFe) alloy, extending transversely from external (or media-facing) surface 26. Depending on embodiment, read shields 22 and 24 shield MR sensor (or MR stack) 20 from stray flux or noise.

Dielectric material 28 may be formed of silica ($SiO_2$) or another nonmagnetic insulator. Depending on embodiment, dielectric material (or dielectric) 28 sometimes forms a read gap layer between first and second read shields 22 and 24, extending from the distal end of MR sensor 20 opposite surface 26 of read/write head 10.

MR sensor 20 extends between read shields 22 and 24, with the stack layers oriented perpendicularly to surface 26. In current-perpendicular-to-plane (CPP) embodiments, MR sensor 20 may span the read gap between read shields 22 and 24, as shown in FIG. 1, and read shields 22 and 24 may also function as electrical contacts for the sense current. In these embodiments, the current propagates in a substantially perpendicularly sense through the layers of MR sensor (MR stack) 20.

In current-in-plane (CIP) configurations, additional side contacts may be used to conduct a sense current through MR sensor 20 in a substantially parallel sense with respect to the stack layers. In these embodiments, MR sensor 20 may be spaced from read shields 22 and 24 by additional layers of dielectric 28.

Writer 16 comprises write pole (or main pole) 30, located between first (leading) return pole 18 and second (trailing) return pole 32. Write pole 30 directs flux from pole tip 34 across surface 26 to magnetic medium (or recording medium) 36. Flux loops from pole tip 34 close back across surface 26 via return poles 18 and 32.

Write pole 30 and return poles 18 and 32 may be formed of magnetically soft, high magnetic moment materials such as NiFe, CoFe and NiCoFe alloys. In some embodiments, write pole 30 has a composite or layered structure, in which the various layers include additional components such as niobium (Nb), zirconium (Zr), tantalum (Ta), aluminum (Al) and copper (Cu). In additional embodiments, one or both of return poles 18 and 32 may have a multilayer structure (e.g., layers 18A and 18B of first return pole 18), for example to enhance flux return. Alternatively, one or both of return poles 18 and 32 may accommodate a pole tip heater or other auxiliary component for writer 16.

Coil (or coils) 38 may be formed of a low resistivity material such as copper (Cu), or, alternatively, silver (Ag) or gold (Au). Coil 38 may be inductively coupled to write pole 30, for example to generate flux through pole tip 34 when energized by a write current. In some embodiments, coil 38 may be formed in helical or solenoidal fashion about write pole 30 and yoke 40, as shown in FIG. 1, or in a spiral or "pancake" (planar) fashion about one or both of back magnetic vias 42.

Write pole 30 and yoke 40 extend from proximal ends oriented toward surface 26 to distal ends proximate magnetic vias 42. Yoke 40 and magnetic vias 42 may be formed of a magnetically soft material such as NiFe or NiCoFe. Depending on embodiment, yoke 40 and magnetic vias 42 may enhance flux delivery to pole tip 34 or close flux loops from return poles 18 and 32 back to yoke 40 and write pole 30, or yoke 40 and magnetic vias 42 may perform both functions.

Additional dielectric or nonmagnetic insulator 44 may surround write pole 30 and yoke 40, electrically insulating coil 38 and forming a nonmagnetic write gap between pole tip 34 and return poles 18 and 32, proximate surface 26. Depending upon embodiment, writer 16 sometimes includes a combination of leading and trailing write shields 46 and 48, or side shield structures, or both. In these various embodiments, one or both of write shields 46 and 48 may be configured with or without side shield elements to adjust the write gap spacing and to provide additional field shaping at pole tip 34.

Flux damper 12 comprises first (bottom) conducting layer 58 and second (top) conducting layer 60. Conductors 58 and 60 may be electrically connected by conducting vias 62 (shown in dashed or hidden lines), forming an inductive loop about return pole 18. The inductive loop may be spaced from return pole 18 by layers of nonmagnetic insulating material such as dielectric or insulating material 44 or 52.

In some embodiments, protective layer 50 covers pole tip 34 and other elements of reader 14 and writer 16 at surface 26. In these embodiments, protective layer 50 may include a diamond-like coating (DLC) or other hard coating, an encapsulant, or both. Depending on embodiment, protective layer 50 can be configured to protect sensitive structures of read/write head 10 or to reduce hard particle contamination of medium 36, or to provide a combination of protection and contaminant reduction.

In manufacture of magnetic head 10, reader 14 and writer 16 may be formed as a number of closely spaced layers, for example by thin film deposition onto a slider body or other substrate material. In the stacked head embodiment of FIG. 1, for example, writer 16 may be formed on top of reader 14, with first (bottom) return pole 18 spaced from second (top) read shield 24 by additional layers of dielectric or insulator 52. Alternatively, bottom return pole 18 may be merged with top read shield 24, or reader 14 and writer 16 may be formed in a substantially coplanar or side-by-side configuration, with reader 14 and writer 16 laterally spaced from one another along surface 26.

During write operations of magnetic head 10, writer 16 writes data in response to a current generated in coil 38, producing magnetic flux in yoke 40 and write pole 30. Flux loops exit write pole 30 at pole tip 34, crossing surface 26 to enter medium 36. The flux loops close back from medium 36 via return poles 18 and 32, through magnetic vias 42 to yoke 40 and write pole 30. Magnetic domain orientations in medium 36 can be determined by the polarity and magnitude of the write current in coil 38, allowing writer 16 to record a sequential bit pattern or other magnetic domain structure onto medium 36 as medium 36 translates along surface 26 in tracking direction S.

Reader 14 reads back data as a function of a sense current across MR sensor 20. The sense current varies with the magnetic domain orientations in medium 36, for example as reflecting the bit pattern laid down by writer 16, or another magnetic domain structure. First and second read shields 22 and 24 may be positioned to shield MR sensor 20 from stray flux or noise, improving speed, sensitivity and reliability at high areal densities.

As flux loops from pole tip 34 close back through return poles 18 and 32, spikes of magnetic flux (that is, regions of high flux density) may form along the media-facing boundary of return poles 18 and 32. These flux spikes may occur, for example, due to changes or polarity transitions in the write current in coil 38, or in the flux through pole tip 34 and return poles 18 and 32. In layered return pole embodiments, flux spikes sometimes form at an interface between pole layers, for example top layer 18A and bottom layer 18B of first return pole 18. Alternatively, flux spikes may occur at other discontinuities in the return pole structure, including edges, cracks, protrusions and sites of hard particle contamination.

Flux spiking can be associated with off-track erasure, side writing or data overwrite. In repeated scans of low-frequency transition patterns, for example, where the transition length may be greater than the trackwise length of magnetic head 10, side erasures in return pole 18 are sometimes associated in time with flux transitions at write pole tip 34. Flux spiking or side erasure (overwrite) regions 54 (projected lines) in medium 36 may also be spaced from low-frequency transitions 56 by approximately the same distance that pole tip 34 is spaced from the center of leading return pole 18.

In addition, return poles 18 and 32 may be wider than pole tip 34, and regions 54 may not occur along the data track. In some embodiments, for example, regions 54 are spaced up to ten, fifteen or twenty-five track widths (or more) on either side of pole tip 34, as described below with respect to FIG. 2. The specific effects of any particular flux damper 12, moreover, are difficult to predict, as dependent upon the detailed geometry of conductors 58 and 60 with respect to writer 16. The involvement of linear and non-linear electrodynamics theory also increases unpredictability, as do variations in the write current and bit rate, and any active circuit elements utilized to regulate or control the damping current.

Figure 2:
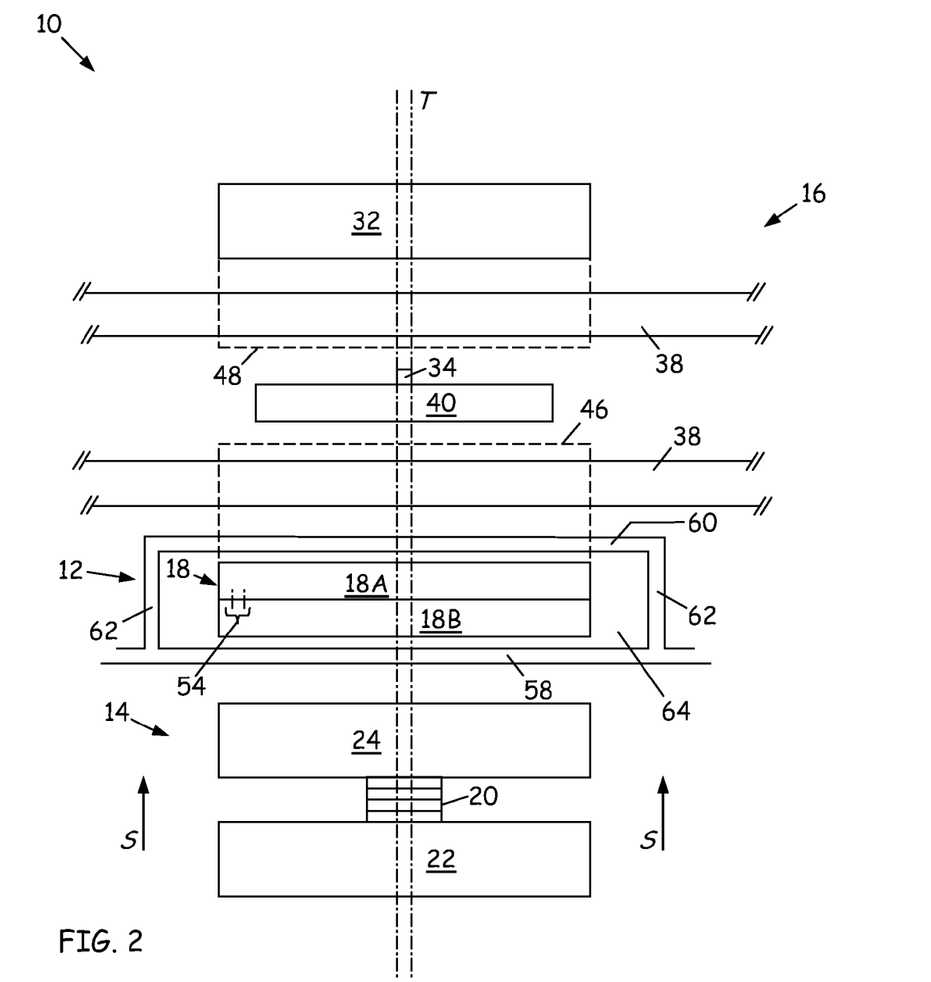
FIG. 2 is a schematic media-facing surface view of a read/write head according to an embodiment having a magnetic damper positioned about a bottom return pole.

FIG. 2 is a schematic media-facing (front or exterior) surface view of the read/write head 10 of FIG. 1, according to an embodiment with magnetic damper 12 for reducing side track erasure by writer 16. In this embodiment, magnetic head 10 comprises reader 14 and writer 16, as described above, with magnetic damper 12 inductively coupled to first (bottom) return pole 18 of writer 16.

In the schematic view of FIG. 2, magnetic head 10 is seen from the perspective of medium 36 as shown in FIG. 1, with leading and trailing write shields 46 and 48 in dashed lines. Magnetic damper 12, coil 38 and yoke 40 are projected onto the media-facing surface, with magnetic damper 12 positioned about return pole 18. Coil 38 may be connected by write vias (not shown), forming a solenoidal structure about yoke 40 and pole tip 34.

Magnetic damper 12 comprises first (bottom) conductor 58, which may be positioned opposite top conductor 60, as shown in FIG. 2, with return pole 18 located in between first and second conductors 58 and 60. Conductors 58 and 60 may further be connected by one or more electrically conducting vias 62, and magnetic damper 12 may be spaced from return pole 18 by nonmagnetic insulator or dielectric material 64. In these embodiments, material 64 may be similar in composition to dielectric or insulating materials 44 and 52 of FIG. 1, above.

In the particular embodiment of FIG. 2, first (bottom) conductor 58 of magnetic damper 12 is located below return pole 18, opposite the write pole (and write pole tip 34), and positioned between return pole 18 and second (top) read shield 24 of reader 14. Second (top) conductor 60 is located above return pole 18, opposite read shield 24 of reader 14 and positioned between return pole 18 and write pole tip 34.

This contrasts with bucking coils and other planar designs, which may be oriented about one or both of magnetic vias 42 rather than return pole 18 or 32. In terms of tracking direction S, moreover, first conductor 58 leads the return pole and second conductor 60 trails the return pole, each occupying different planes that can be separated in or along the trackwise direction. Alternatively, the first and second conductor designations may be reversed, and, depending upon the particular orientation of the other writer components, second conductor 60 may lead return pole 18 or 32, and first conductor 58 may trail return pole 18 or 32 (see, e.g., FIG. 3).

During operation of writer 16, bits may be laid down along track T as a function of the magnetic flux emitted by write pole tip 34. Depending on embodiment, polarity transitions can be generated by switching the write current in coil 38, for example via inductive couplings to yoke 40 and write pole 30 with pole tip 34. Flux transitions may also propagate back to return poles 18 and 32 through a back magnetic via or other magnetic coupling structure, as shown in FIG. 1. Such coupling may occur as a relatively fast process, preceding the complete closure of flux loops through the magnetic medium, and may further cause flux spiking and side-track erasure or overwrite as described above.

Because return poles 18 and 32 may be wider than write pole tip 34, flux spiking or side erasure regions 54 may be separated from track T in a cross-track direction, as described above, for example with a lateral spacing of many times the track width. As a result, regions 54 may not pass under pole tip 34 in an ensuing write operation, raising the possibility of off-track data corruption when flux spikes reduce the signal-to-noise ratio (SNR) of off-track bits, increasing the bit error rate (BER). The cross-track spacing may not be known a priori, moreover, and the resultant bit corruption (and other related effects) may be difficult to predict, diagnose, trace and correct.

Magnetic flux damper 12 addresses this issue by generating an inductive electromotive force (EMF) to slow the response of return pole 18 to flux transitions generated in write pole 30. In particular, conducting vias 62 connect first and second conductors 58 and 60 to form a damping loop that substantially surrounds return pole 18 or return pole 32, or both.

Magnetic damper 12 is thus inductively coupled to one or both of return poles 18 and 32. Depending on embodiment, for example, the inductive loop may encompass magnetic coupling in regions 54 that are laterally spaced from track T by many track widths, and the induced EMF may have sufficient magnitude to reduce flux spiking, side writing and off-track erasure or over-writing during bit or polarity transitions, or due to other changes or transitions in the write current or emitted flux density, without substantially affecting flux loop closure during the write plateau.

Figure 3:
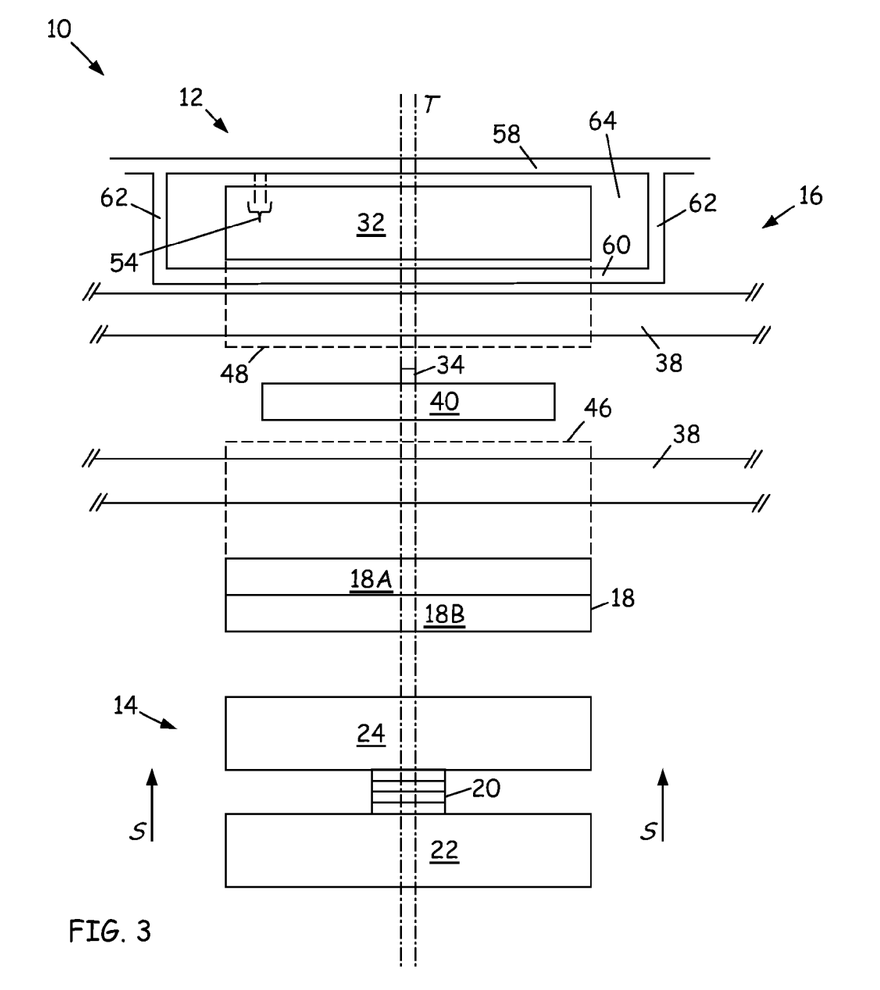
FIG. 3 is an alternate media-facing surface view of a read/write head according to an embodiment having a magnetic damper positioned about a top return pole.

FIG. 3 is an alternate media-facing surface (or front) view of an embodiment of magnetic head 10 with reader 14 and writer 16. As in FIG. 2, above, leading and trailing write shields 46 and 48 are shown in dashed lines and magnetic damper 12, coil 38 and yoke 40 are projected onto the media-facing surface. In the particular embodiment of FIG. 3, magnetic damper 12 may be inductively coupled to second (top) return pole 32 of writer 16, or to both second (top) return pole 32 and first (bottom) return pole 18.

As shown in FIG. 3, first (bottom) conductor 58 of magnetic damper 12 may be positioned opposite second (top) conductor 60, with second (top) return pole 32 spaced between conductors 58 and 60 by nonmagnetic material or insulator 64. First and second conductors 58 and 60 may be connected by one or more conducting vias 62, forming magnetic damper 12 in a solenoidal embodiment. Magnetic damper 12 may further perform one or more functions including, but not limited to, slowing or damping the magnetic response of return pole 32, reducing or limiting magnetic flux spiking, and reducing side-track overwrite or erasure.

In the embodiment of FIG. 3, first conductor 58 may be a top conductor, located above return pole 32 and opposite the write pole at pole tip 34. Second conductor 60 may be a bottom conductor, located below return pole 32 and between return pole 32 and write pole tip 34. In terms of the tracking direction S, this orientation may be reversed with respect to FIG. 2, with second conductor 60 leading return pole 32 (or return pole 18) and first conductor 58 trailing return pole 32 (or return pole 18).

Figure 4A:
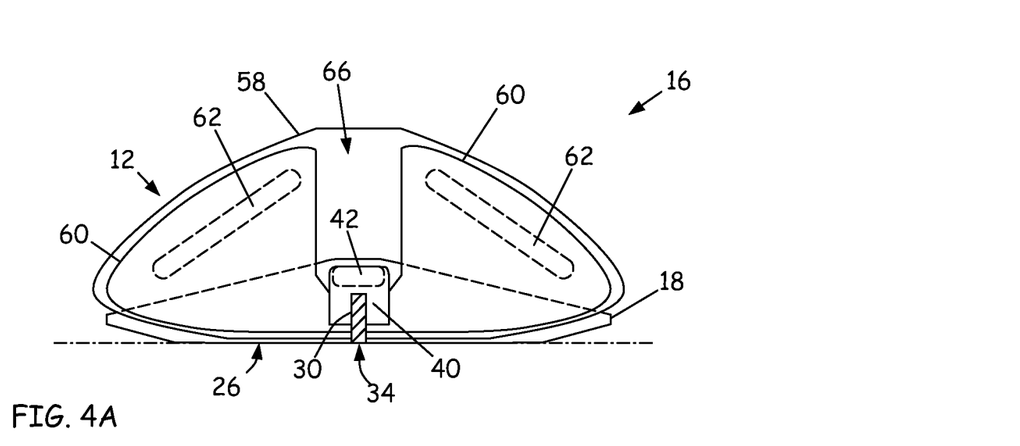
FIG. 4A is a top view of a read/write head, illustrating damper geometry.

FIG. 4A is a top view of example magnetic writer 16 for read/write head 10, illustrating the geometry of flux damper 12. In this particular embodiment, magnetic damper 12 comprises bottom conductor 58 and top conductor 60, which may be connected by one or more conducting vias 62 to form an inductive flux loop about bottom return pole 18. Alternatively, the geometry varies, and magnetic damper 12 may be positioned about a second (top) return pole, as shown in FIG. 3, above, or about a shared return pole/write shield applicable to a merged head design.

Figure 4B:
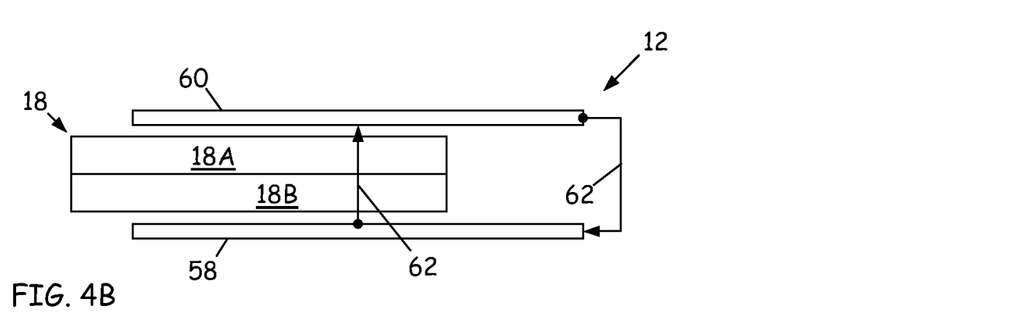
FIG. 4B is a schematic circuit diagram for a magnetic damper, according to a single-loop embodiment.

FIG. 4A shows writer 16 in a top view, with the front surface of FIGS. 2 and 3 directed downward along surface 26. Conducting vias 62 and the hidden portions of return pole 18 are shown in dashed lines. In this embodiment, first (bottom) conductor 58 may be located below return pole 18 and second (top) conductor 60 may be positioned above return pole 18, for example as shown in FIG. 4B, below.

As shown in FIG. 4A, magnetic yoke 40 may be located above top conductor 60, and magnetically coupled to return pole 18 via one or more magnetic vias 42. Write pole 30 (cross-hatched) may be magnetically coupled to yoke 40, with write pole tip 34 oriented toward surface 26. One or both of first conductor 58 and second conductor 60 may further be provided with cutout 66, as shown for first conductor 60 in FIG. 4A, for example to provide a cutout region or regions to accommodate additional write structures including magnetic vias 42.

Conductors 58 and 60 provide more or less complete conductive coupling, depending upon geometry. As shown in FIG. 4A, for example, first and second conductors 58 and 60 may extend farther from surface 26 than does return pole 18. Further, conductors 58 and 60 may have approximately the same width as return pole 18, as shown for first conductor 58, or a greater width than return pole 18, as shown for second conductor 60. Alternatively, the widths of conductors 58 and 60 vary with respect to return pole 18, for example as shown in FIG. 3. Depending on embodiment, the geometry of conductors 58 and 60 may further be configured to adjust the coupling and response of magnetic damper 12, or to accommodate other structures on magnetic writer 16, including, but not limited to, magnetic vias 42, conducting vias 62, a write coil, a pole tip heater, or another pole, shield or via structure.

The number, position and shape of conducting vias 62 vary with the geometry of conductors 58 and 60, and with the configuration of writer 16 and return pole 18. In particular, conducting vias 62 may be positioned to form an inductive loop about return pole 18, and the induced EMF may oppose flux transients propagating from write pole 30 through magnetic vias 42 to return pole 18. The specified degree of coupling varies with the geometry of conductors 58 and 60, and with the presence or absence of additional circuit elements used to help generate or modify the damping current.

FIG. 4B is a schematic circuit diagram for magnetic damper 12, according to a single-loop embodiment. In this embodiment, conducting vias 62 (shown in schematic form) connect first conductor 58 to second conductor 60, forming a passive inductive loop about bottom return pole 18.

In both passive and active embodiments, the effects of magnetic damper 12 are based on Faraday's Law of magnetic induction. That is, $$EMF = -\frac{d\Phi}{dt}, \qquad [1]$$

where the induced EMF is related to flux $\Phi$ through the inductive loop formed by magnetic damper 12. According to Faraday's Law, the induced EMF is proportional to the time rate of change in magnetic flux $\Phi$, which in turn depends on the geometry of magnetic damper 12, and on the magnitude and timing of the flux transitions as they propagate through write pole tip 34 and return pole 18.

The negative sign in Faraday's Law can be interpreted to indicate that the induced EMF acts to oppose changes in flux Φ, in accordance with Lenz' Law. Thus the induced EMF may generate a damping current in magnetic damper 12, and the damping current may generate a counter-flux that acts to oppose the change in flux Φ. Magnetic damper 12 may thus damp or slow the response of return pole 18 to flux and write current transitions, as described above, and the damping effects may apply to transitions or changes in flux Φ that propagate either through the magnetic medium or through a direct coupling to the write pole such as a yoke or magnetic via. Depending on embodiment, magnetic damper 12 may further support a damping current that generates sufficient opposing flux (or counter-flux) to limit flux spiking from return pole 18 into the magnetic medium, or to reduce the effects of off-track erasure and side-track writing, or both, as compared to read/write head operations performed without a damping current as provided by magnetic damper 12.

The damping current depends on the induced EMF and on the overall impedance of the damping circuit, as based on the generalized form of Ohm's Law. That is, $$I_D = \frac{EMF}{Z}, \quad [2]$$

Where Z is the impedance of the damping loop and damping current $I_D$ is driven through impedance Z by the induced EMF from Faraday's Law. In general, impedance Z can be frequency dependent, so the damping current may vary with the sharpness of the transitions in flux Φ, as emitted by pole tip 34 and as propagating through return pole 18.

Figure 4C:
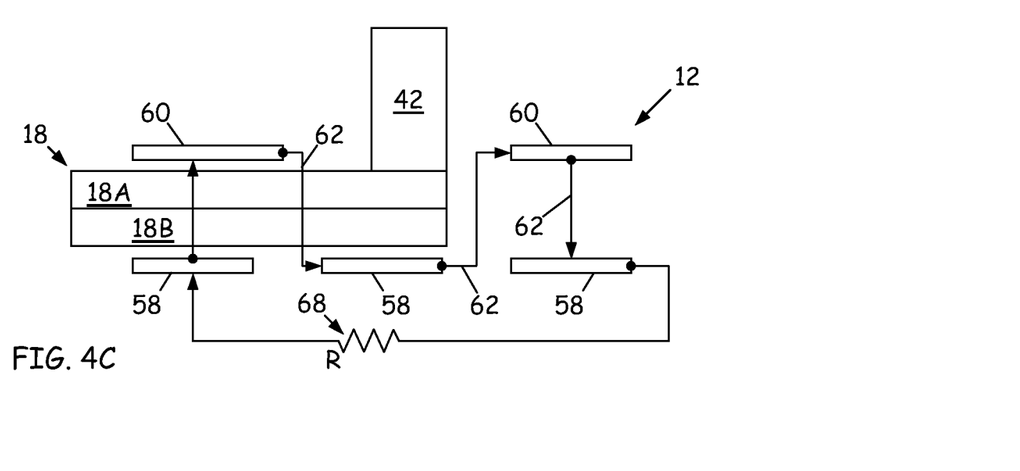
FIG. 4C is an alternate schematic for a magnetic damper, according to an embodiment having segmented damper components.

FIG. 4C is an alternate schematic circuit diagram for magnetic damper 12, according to an embodiment with segmented damper components and series resistance. In this embodiment, first and second conductors 58 and 60 may be divided into a number of separate parts, and series resistance R may be provided to complete the inductive loop circuit.

Based on Faraday's Law, the induced EMF (and thus the damping current) increases as a function of the number of loops formed by damper 12 about return pole 18. As opposed to the one-loop structure of FIG. 4B, for example, the number of loops may be increased by segmenting conductors 58 and 60, and by adding additional conducting vias 62 to form a multi-loop inductive coil. In multi-loop embodiments, however, impedance Z also tends to increase, and the damping current depends not only on the number of loops but also on total impedance (Z), and on the time rate of change in flux Φ through magnetic damper 12.

In some embodiments, resistor 68 (e.g., a resistive trace or thin-film resistor element) may be provided to complete the damping circuit, and resistance R may be substantial as compared to loop impedance Z. In these embodiments, resistor 68 may limit the damping current or damping effect, or both, and resistor 68 may enhance flux return from the magnetic medium. Alternatively, the loop circuit may be closed with a highly conducting material, with small resistance R as compared to total loop impedance Z, and the damping current may be determined primarily by the geometry and composition of conductors 58 and 60, along with conducting vias 62.

Figure 5A:
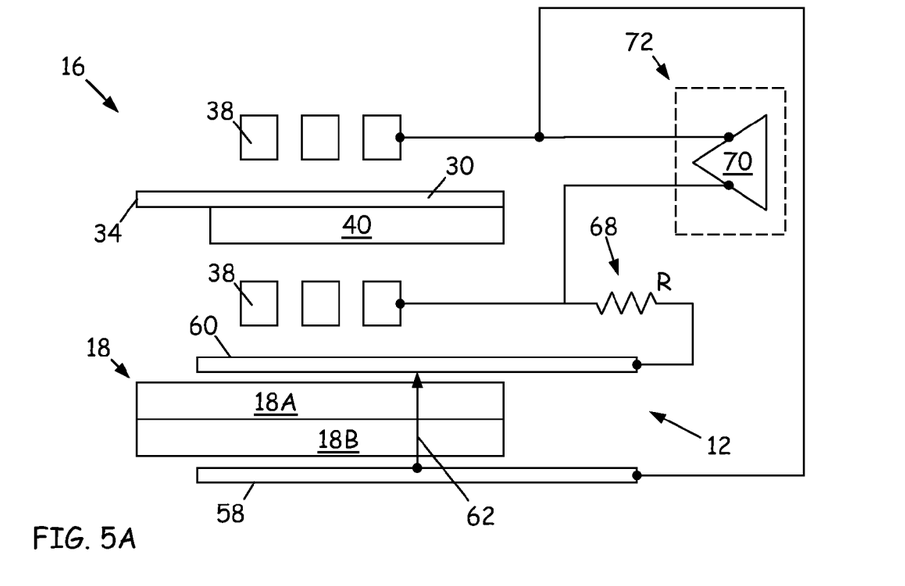
FIG. 5A is schematic circuit diagram for a magnetic damper, according to an actively driven embodiment with resistive coupling to a write coil.

FIG. 5A is schematic circuit diagram for example magnetic damper 12, according to an actively driven embodiment with magnetic damper 12 positioned about first return pole 18 and with parallel resistive coupling to write coil 38 via resistor 68. As shown in FIG. 5A, write driver 70 may be provided to drive current through write coil 38, generating flux in yoke 40 and write pole 30. Data may be written as a function of the flux emitted at write pole tip 34, as described above, and the flux loops may close back through return pole 18. In some embodiments, write current driver 70 may further be located off the magnetic head, for example on flex circuit 72, or mounted on a suspension arm or other component of an actuator assembly.

In the actively driven embodiment of FIG. 5A, write driver 70 generates current through magnetic damper 12 based on the resistive coupling provided by resistor 68. As a result, the damping current depends on a combination of electromagnetic induction and the write current. In particular, resistor 68 may resistively couple magnetic damper 12 to write coil 38, and the resulting damping current may oppose polarity transitions in the write flux. In addition, resistance R may be selected to perform frequency filtering in combination with a capacitive element, or based on the inductive qualities of magnetic damper 12, or both, for example to limit higher-frequency flux spike components due to polarity transitions without substantially affecting lower-frequency components characterizing flux return over the plateau portion of a write pulse.

Figure 5B:
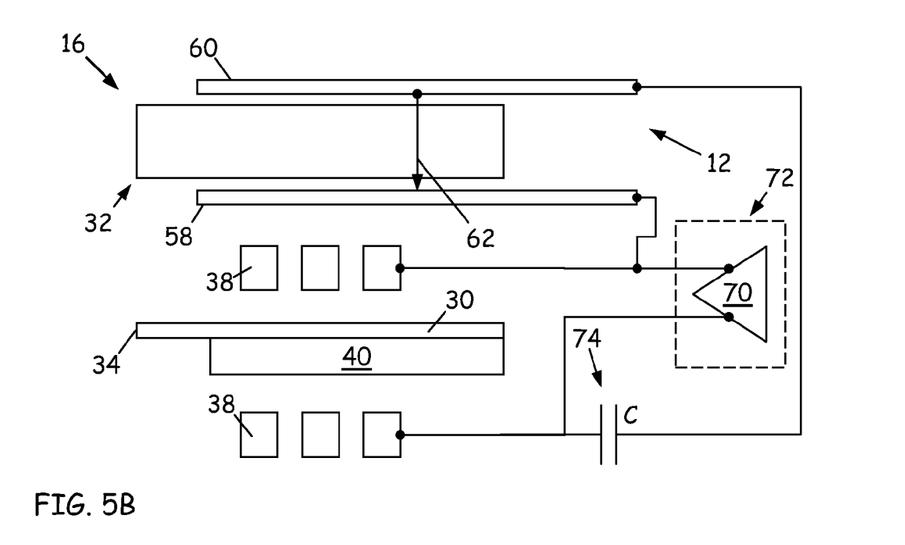
FIG. 5B is an alternate schematic for a magnetic damper, according to an actively driven embodiment with capacitive coupling to a write coil.

FIG. 5B is an alternate schematic for magnetic damper 12, according to an actively-driven embodiment with magnetic damper 12 positioned about second return pole 32 and with capacitive coupling to write coil 38 via capacitor 74. As opposed to the resistive coupling embodiment of FIG. 5A, capacitive coupling may be based on a differential of the write current, and may generate additional damping current primarily during flux transitions, without substantial contribution after the write current plateaus.

The value of capacitance C may further be selected primarily to slow the response of return pole 32 (or return pole 18) during polarity transitions. The current through capacitor 74 may thus be small through the write plateau, and there may be no substantial effect on flux loop closure except during the transition period, when spike suppression is achieved.

Figure 6A:
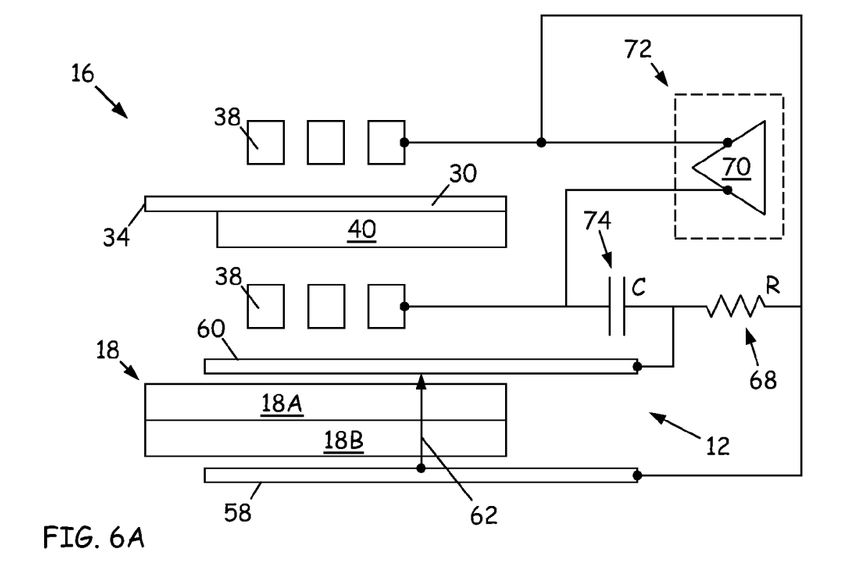
FIG. 6A is a second alternate schematic for a magnetic damper, according to an actively driven embodiment with RC coupling to the write coil.

FIG. 6A is a second alternate schematic for magnetic damper 12, according to an actively driven embodiment with RC coupling to write coil 38. In this embodiment, flux damper 12 may be positioned about first return pole 18, with RC coupling to write coil 38 via resistor 68 and capacitor 74.

In RC coupling, the damping current may be generated primarily during write current transitions, and may allow for additional shaping of the damping current based on resistance R. In some embodiments, RC coupling provides for frequency filtering of the damping current, for example via high-pass filtering to address rapid switching of the write current while limiting effects on low-frequency components associated with the write plateau. In further embodiments, frequency filtering is performed in combination with inductive coupling of magnetic damper 12, as described above.

Figure 6B:
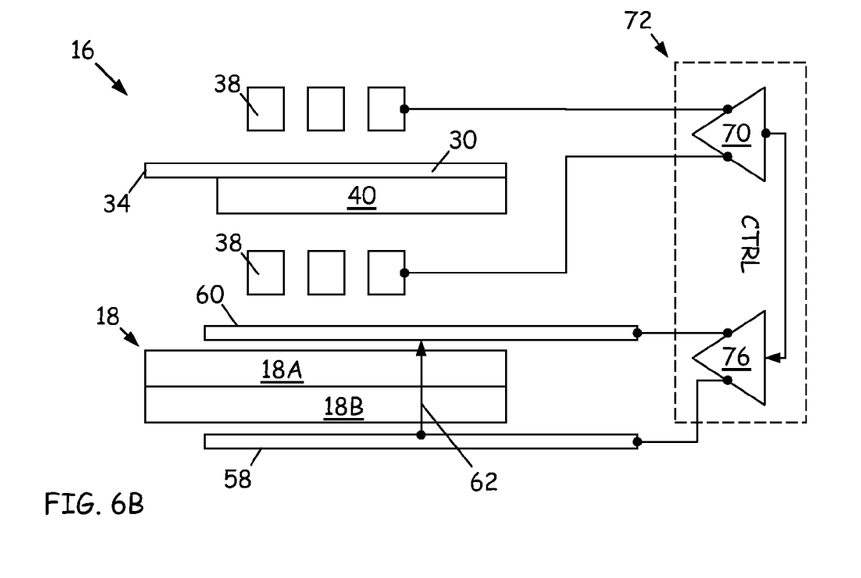
FIG. 6B is a third alternate schematic for a magnetic damper, according to an embodiment having an independent damping current driver.

FIG. 6B is a third alternate schematic for magnetic damper 12, according to an embodiment with an independent damping current driver. In this embodiment, magnetic damper 12 may be decoupled from write coil 38, as in the passively-driven embodiments of FIGS. 4B and 4C, above, but with additional damping flux generated by damping current driver 76.

Damping current driver 76 may be located off the magnetic head, for example on flex circuit 72 with write driver 70. Off-head positioning allows damping current driver 76 to employ sophisticated pulse shaping, due to the greater area available for active circuit components. In particular, damping current driver 76 may be configurable to generate a damping current pulse that substantially reduces flux spiking and off-track erasure during write current transitions. In some of these embodiments, damping current driver 76 may be coupled to write driver 70 (e.g., via control link CTRL), for example to address timing jitter and pulse shape variations.

While this disclosure has been described with reference to particular embodiments, the terminology used is for the purposes of description, not limitation. Workers skilled in the art will recognize that changes may be made in form and detail without departing from the spirit and scope of the technology, including the substitution of various equivalents for particular elements thereof, and adaptation of the disclosure's teachings to different materials, situations and circumstances. Thus the present disclosure is not limited to the particular embodiments disclosed herein, but encompasses all embodiments falling within the scope of the appended claims.

The invention claimed is:

1. A head comprising:
a main pole configured to emit flux;
a return pole configured to return the flux to the main pole; and
a magnetic damper substantially surrounding and inductively coupled to the return pole, the magnetic damper comprising:
first and second conductors spaced from the return pole; and
at least one third conductor connecting the first conductor to the second conductor.

2. The head of claim 1, wherein the first conductor is spaced from a first side of the return pole, opposite the main pole, and wherein the second conductor is spaced from a second side of the return pole, between the main pole and the return pole.

3. The head of claim 2, wherein the magnetic damper is configured to dampen flux spikes at an interface between a first layer of the return pole and a second layer of the return pole.

4. The head of claim 1, wherein the magnetic damper is electrically decoupled from a write coil.

5. The head of claim 4, wherein a damping current is passively driven through the first and second conductors based on transitions in the flux.

6. The head of claim 4, wherein at least one of the first and second conductors is segmented to form a multi-loop inductive coil about the return pole.

7. The head of claim 1, further comprising a resistor configured to resistively couple the magnetic damper to the write coil.

8. The head of claim 1, further comprising a capacitor configured to capacitively couple the magnetic damper to a write coil.

9. The head of claim 8, further comprising a resistor configured to frequency filter the capacitive coupling of the magnetic damper to a write coil.

10. A writer comprising:
a write pole inductively coupled to a write coil, wherein the write pole emits flux generated by the write coil;
a return pole magnetically connected to the write pole, wherein the return pole returns the flux emitted by the write pole; and
a magnetic damper substantially surrounding and inductively coupled to the return pole, the magnetic damper comprising:
first and second conducting layers respectively positioned on opposite sides of the return pole and at least one conducting via connecting the first conducting layer to the second conducting layer.

11. The writer of claim 10, wherein the return pole comprises an interface between layers of the return pole, and wherein the magnetic damper dampens_flux spikes at the interface.

12. The writer o f claim 10, wherein the first and second conducting layers are segmented, and wherein the magnetic damper comprises a multi-loop damping coil configured to be inductively coupled to the return pole.

13. The writer o f claim 12, wherein the multi-loop damping coil is configured to be electrically decoupled from the write coil.

14. The writer o f claim 10, further comprising a resistor connecting the write coil to the magnetic damper.

15. The writer of claim 10, further comprising a capacitor connecting the write coil to the damping coil.

16. A read/write head comprising:
a magnetically responsive reader configured to read data;
a writer configured to write the data, the writer comprising
a write pole configured to emit write flux, and a return pole configured to return the write flux to the write pole; and
a damping loop substantially surrounding the return pole and configured to dampen response of the return pole to the changes in the write flux, the damping loop comprising first and second conductors respectively spaced on opposing sides of the return pole and a third conductor connecting the first and second conductors, wherein the damping loop generates a damping flux to oppose the transitions in the write flux.

17. The re ad/write head of claim 16, wherein the return pole comprises an interface between layers of the return pole, and wherein the damping flux limits flux spikes generated at the interface.

18. The read/write head of claim 17, wherein the damping loop is electrically decoupled from a write coil.

19. The read/write head of claim 17, further comprising a capacitor configured to capacitively couple the damping loop to a write coil.

20. The read/write head of claim 17, further comprising a resistor configured to resistively couple the damping loop to a write coil.

21. A method comprising:
emitting flux from a write pole;
returning the flux to the write pole via a return pole;
generating a transition in the flux emitted from the write pole;
inducing an electromotive force (EMF) in a magnetic damper substantially surrounding and inductively coupled to the return pole, based on the transition in the flux emitted from the write pole, the magnetic damper comprising first and second conductors spaced from the return pole and connected via a third conductor;
generating a damping current in the magnetic damper, based on the EMF; and
generating an opposing flux in the return pole, based on the damping current;
wherein the opposing flux opposes dampens a response of the return pole by opposing the transition in the flux emitted by the write pole.

22. The method of claim 21, wherein generating the damping current comprises passively generating the damping current based on an inductive coupling between the magnetic damper and the return pole.

23. The method of claim 21, wherein emitting flux from the write pole the flux is emitted toward a medium, wherein flux from the return pole returns the flux from the medium, and wherein an opposing flux sufficient to oppose the flux and reduce flux spiking from the return pole into the medium.

24. The method of claim 21, wherein the transition in the flux with a write coil, and wherein the damping current is generated based on a resistive coupling between the damping loop and the write coil.

25. The method of claim 21, wherein the transition in the flux is generated with a write coil, and wherein the damping current is generated based on a capacitive coupling between the damping loop and the write coil.

\* \* \* \* \*

UNITED STATES PATENT AND TRADEMARK OFFICE
CERTIFICATE OF CORRECTION

| | | |
|---|---|---|
| PATENT NO. | : 8,416,529 B2 | Page 1 of 1 |
| APPLICATION NO. | : 12/870490 | |
| DATED | : April 9, 2013 | |
| INVENTOR(S) | : Steven Bruce Marshall | |

It is certified that error appears in the above-identified patent and that said Letters Patent is hereby corrected as shown below:

In the Claims

In Col. 10, line 3
replace "dampens_flux"
with "dampens flux."

In Col. 10, line 5
replace "o f"
with "of."

In Col. 10, line 9
replace "o f"
with "of."

In Col. 10, line 13
replace "o f"
with "of."

In Col. 10, line 31
replace "re ad"
with "read."

Signed and Sealed this
Sixteenth Day of July, 2013

Teresa Stanek Rea
*Acting Director of the United States Patent and Trademark Office*